United States Patent
Potharaju et al.

(10) Patent No.: US 12,432,680 B2
(45) Date of Patent: Sep. 30, 2025

(54) ON-DEMAND POSITIONING OF 5G DEVICES

(71) Applicant: Cisco Technology, Inc., San Jose, CA (US)

(72) Inventors: Shailender Potharaju, Fremont, CA (US); Indermeet Singh Gandhi, San Jose, CA (US); Clark A. Carty, Brunswick, OH (US); Fred J. Anderson, Lakeville, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 636 days.

(21) Appl. No.: 17/854,427

(22) Filed: Jun. 30, 2022

(65) Prior Publication Data
US 2024/0007985 A1    Jan. 4, 2024

(51) Int. Cl.
H04W 64/00    (2009.01)
H04B 17/327    (2015.01)
(Continued)

(52) U.S. Cl.
CPC .......... *H04W 64/00* (2013.01); *H04B 17/327* (2015.01); *H04W 48/04* (2013.01); *H04W 48/16* (2013.01); *H04W 72/0446* (2013.01)

(58) Field of Classification Search
None
See application file for complete search history.

(56) References Cited

U.S. PATENT DOCUMENTS 9,986,373 B2 *    5/2018    Davydov ............... G01S 19/05
11,122,455 B2 *   9/2021    Lee ..................... H04L 43/0811
(Continued)

FOREIGN PATENT DOCUMENTS

JP         6959333 B2 *  11/2021    ......... H04L 25/0204

OTHER PUBLICATIONS

Anderson et al., "VRAN Capacity Enhancement Solution by Radio Unit Self-Discovery and Self-Management," https://www.tdcommons.org/dpubs_series/5062, Apr. 2022, 10 pages.
(Continued)

*Primary Examiner* — Adolf Dsouza
(74) *Attorney, Agent, or Firm* — Edell, Shapiro & Finnan, LLC

(57) ABSTRACT

A method comprises: at a radio access network configured to communicate with a user equipment (UE) wirelessly, an access and mobility management function (AMF), and a positioning service, and through which the UE attached to a network using an attach procedure with the AMF: upon receiving a request for a location of the UE from the positioning service, scheduling resource blocks, configured for acquiring location measurements, across multiple radio units (RUs) of the radio access network, such that the resource blocks are synchronized in time and frequency across the multiple RUs; by the multiple RUs, exchanging, with the UE, the resource blocks as synchronized, and acquiring the location measurements from the multiple RUs based on exchanging; and forwarding the location measurements to the positioning service to enable the positioning service to determine the location of the UE based on the location measurements.

20 Claims, 6 Drawing Sheets

(51) Int. Cl.
*H04W 48/04* (2009.01)
*H04W 48/16* (2009.01)
*H04W 72/0446* (2023.01)

(56) References Cited

U.S. PATENT DOCUMENTS

2020/0154240 A1* 5/2020 Edge .................. H04W 4/029
2022/0003830 A1   1/2022 Cha et al.
2022/0007148 A1   1/2022 Hao et al.
2022/0109466 A1   4/2022 Manolakos et al.
2022/0408220 A1* 12/2022 Edge .................. H04W 4/029
2024/0323711 A1* 9/2024 Li ....................... H04B 17/17

OTHER PUBLICATIONS

Anderson et al., "Network Listen Function With Embedded Auxiliary Receiver," https://www.tdcommons.org/dpubs_series/3990, Jan. 2021, 5 pages.
Cisco, "Cisco DNA Spaces," https://www.cisco.com/c/en_in/solutions/enterprise-networks/dna-spaces/index.html, retrieved May 6, 2022, 14 pages.

* cited by examiner

ON-DEMAND POSITIONING OF 5G DEVICES

TECHNICAL FIELD

The present disclosure relates to positioning of a user device attached to a network.

BACKGROUND

Cellular network-based positioning is an important technology for 3rd Generation Partnership Project (3GPP) (hereinafter "5G") vertical industries, individuals, and operators, especially in local indoor scenarios. 5G new radio (NR) positioning is introduced by 3GPP Rel.16. A location management function (LMF) resides in the 5G core network (i.e., the "3GPP packet core") and acts as a location server. The Long Term Evolution (LTE) positioning protocol (LPP) is reused for user equipment (UE) measurements for positioning, while NR positioning protocol (NRPPa) based on LPPa is used for gNodeB (gNB) (i.e., base station) measurements. NRPPa protocol data units (PDUs) are routed between an eNB/gNB and the LMF via an access and mobility management function (AMF). Thus, current UE positioning services under 3GPP/5G use a complex architecture that is dependent on 5G core network functions/elements. Long route messages between the eNB/gNB and the LMF may suffer network jitter and lead to non-real-time UE location results, instead of desired real-time results.

DESCRIPTION OF EXAMPLE EMBODIMENTS

Overview

In an embodiment, a method comprises: at a radio access network configured to communicate with a user equipment (UE) wirelessly, an access and mobility management function (AMF), and a positioning service, and through which the UE attached to a network using an attach procedure with the AMF: upon receiving a request for a location of the UE from the positioning service, scheduling resource blocks, configured for acquiring location measurements, across multiple radio units (RUs) of the radio access network, such that the resource blocks are synchronized in time and frequency across the multiple RUs; by the multiple RUs, exchanging, with the UE, the resource blocks as synchronized, and acquiring the location measurements from the multiple RUs based on exchanging; and forwarding the location measurements to the positioning service to enable the positioning service to determine the location of the UE based on the location measurements.

EXAMPLE EMBODIMENTS

Embodiments presented herein provide a simplified architecture and related technique for acquiring on-demand, real-time, UE location for use by enterprises involved with retail, manufacturing, stadiums, and other types of venues, for example. According to the embodiments, a cloud-based location service (i.e., a "positioning service") accessible to an enterprise determines a location of a UE for the enterprise using a simplified architecture that includes (i) a radio access network (RAN), and (ii) an AMF through which the UE accesses/attaches to a 5G network, but without using or interacting with a conventional LMF or gateway mobile location center (GMLC) in a core of the 5G network. The RAN independently reports location measurements without involving 5G core network functions. The embodiments are described below in the context of a network by way of example; however, it is understood that the embodiments apply to other types of communication networks. As used herein, the terms "location" and "position" are synonymous and may be used interchangeably.

Figure 1:
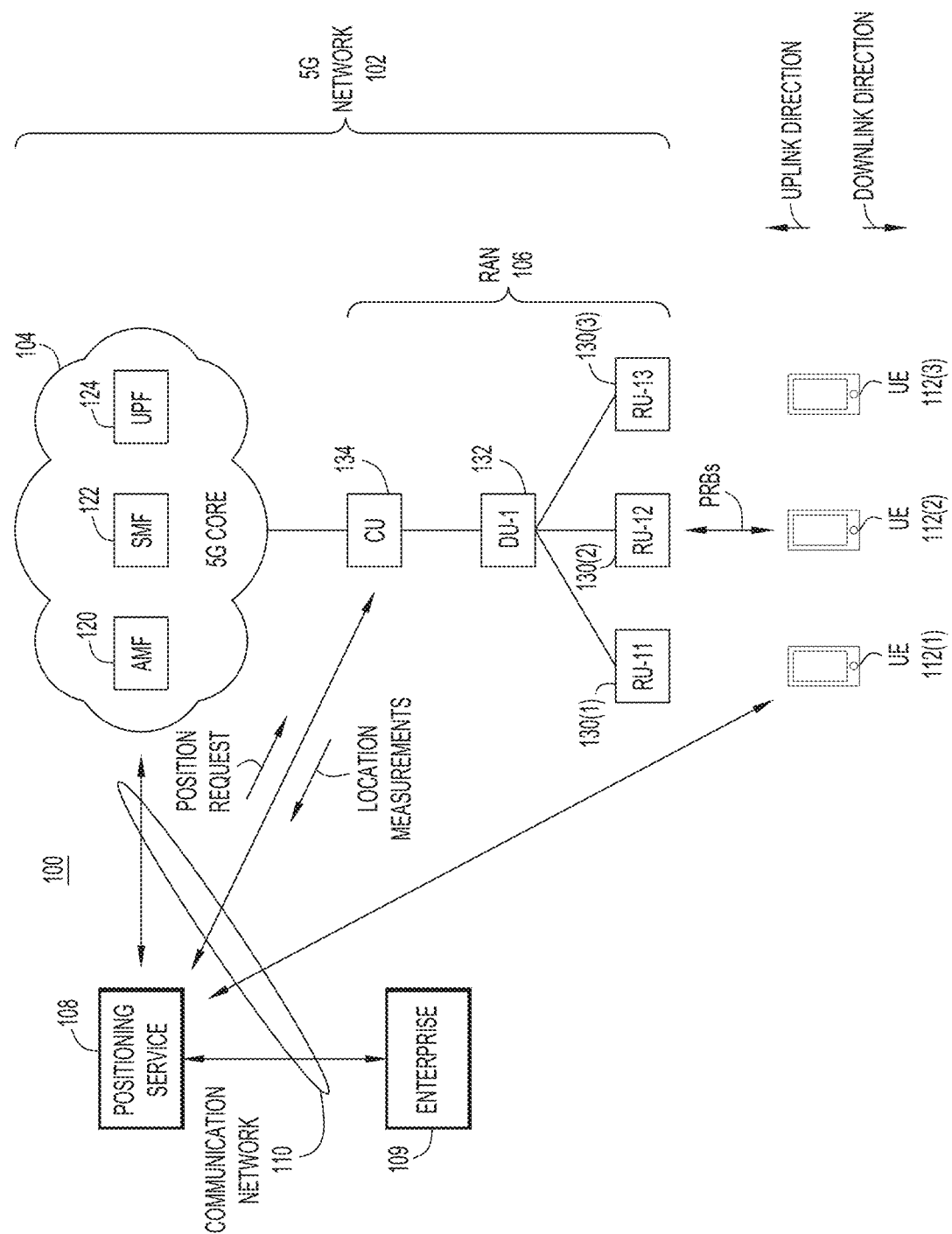
FIG. 1 is a network environment in which UE positioning may be implemented, accordance to an example embodiment.

With reference to FIG. 1, there is an example network environment 100 in which UE positioning according to embodiments presented herein may be implemented. Network environment 100 includes a 5G network 102 comprising core elements or functions 104 (collectively referred to as a "5G core 104") and a disaggregated RAN 106 configured to communicate with each other over various network interfaces. Network environment 100 also includes a cloud-based positioning service 108 configured to communicate with core functions 104, RAN 106, and an enterprise 109 over a network 110, which may include or overlap with portions of 5G network 102. Network 110 may include one or more wide area networks (WANs), such as the Internet, and one or more local area networks (LANs). Network environment 100 further includes UEs 112(1), 112(2), and 112(3) (collectively referred to as UEs 112) configured to communicate wirelessly with 5G network 102 through RAN 106 and with positioning service 108 through network 110. UEs 112 may include, but are not limited to, portable computers, Smartphones, and the like.

Positioning service 108 may comprise various positioning applications hosted on one or more servers of a data center, for example. In an example, positioning service 108 may include the Cisco Digital Network Architecture (DNA) spaces. Positioning service 108 may exchange data packets with 5G network 102, enterprise 109, and UEs 112 using any known or hereafter developed network communication protocols, such as the Transmission Control Protocol (TCP)/Internet Protocol (IP) suite of protocols, for example.

In the example of FIG. 1, core functions 104 include an AMF 120, a session management function (SMF) 122, and a user plane function (UPF) 124. It is understood the that the 5G core includes additional functions; however, such additional functions may not be used to implement UE positioning according to the embodiments presented herein, and are therefore omitted from FIG. 1. A UE (e.g., UE 112(1)) may communicate with AMF 120 via RAN 106. AMF 120 may communicate control signaling (e.g., non-access stratum (NAS) signaling) with the UE using an N1 interface. AMF 120 may communicate control signaling with RAN 106 using an N2 interface. The AMF 120 may support termination of NAS signaling, NAS ciphering and integrity protection, registration management, connection management, and/or mobility management. AMF 120 may support access, authentication, and authorization (AAA) and/or security context management.

AMF 120 may communicate control signaling with SMF 122 using an N11 interface. SMF 122 may support session establishment, modification, and/or release. SMF 122 may allocate and manage the allocation of an IP address to the UE. SMF 122 may support dynamic host configuration protocol (DHCP) functions, and termination of NAS signaling related to session management. SMF 122 may support traffic steering configuration for UPF 124.

UPF 124 may communicate control signaling with SMF 122 using an N4 interface. UPF 124 may communicate data signaling with the RAN 106 using an N3 interface. UPF 124 may support packet routing and forwarding, packet inspection, and handling of quality of service (QoS). UPF 124 may function as an external protocol data unit (PDU) session point of interconnect to a data network (DN), such as the Internet.

In the example of FIG. 1, RAN 106 is configured as a disaggregated RAN that includes multiple radio units (RUs) 130(1), 130(2), and 130(3) (collectively referred to as RUs 130), a distributed unit (DU) 132 configured to control the multiple radio units, and a centralized unit (CU) 134 configured to control the DU and communicate with core functions 104. RUs 130(1), 130(2), and 130(3) are also denoted RU-11, RU-12, and RU-13, respectively. Three RUs are shown in FIG. 1 by way of example, only. More than three RUs may be employed in the disaggregated RAN. RUs 130 each include one or more antennas and associated radio hardware, such as a digital front end (DFE) and physical (PHY) layer components. Each RU may include digital beamforming functionality. DU 132 serves as a scheduler/controller of RUs 130, and may be configured with identifiers and physical coordinates of each of RUs 130. DU 132 provides support for lower layers of the protocol stack, such as radio link control (RLC), media access control (MAC), and the PHY layer. CU 134 provides support for higher layers of the protocol stack, such as the service data adaptation protocol (SDAP), the packet data convergence protocol (PDCP), and the radio resource control (RRC) protocol.

RUs 130 exchange physical resource blocks (PRBs) (also referred to as "resource blocks (RBs)") with a UE (e.g., UE 112(1)) over an air interface under control of/as scheduled by DU 132. In a downlink direction, the RUs transmit downlink PRBs to the UE as scheduled by DU 132. In an uplink direction, the UE transmits uplink PRBs to RUs 130 as scheduled by DU 132. That is, DU 132 schedules time slots and allocates frequencies for the uplink and downlink PRBs for the UE across RUs 130. For example, DU 132 (*i*) schedules time slots, and allocates frequencies, across RUs 130 for transmission of the downlink PRBs from the RUs to the UE, and (ii) schedules time slots, and allocates frequencies, across the RUs for reception of uplink PRBs transmitted by the UE.

At a high-level, a request for a location of a UE originated at enterprise 109 flows through positioning service 108 to DU 132 of RAN 106. DU 132 schedules uplink and downlink PRBs for acquiring uplink and downlink location measurements for the UE across RUs 130. Responsive to the scheduling by DU 132, RUs 130 and the UE exchange the PRBs, derive the location measurements based on the exchange, and forward the location measurements to DU 132. DU 132 forwards the location measurements to positioning service 108 via CU 134. Positioning service 108 determines the location of the UE based on the location measurements, and forwards the location to enterprise 109. The aforementioned process acquires the location of the UE without involving the LMF in the 5G network. Further details of the positioning process are described below.

Figure 2:
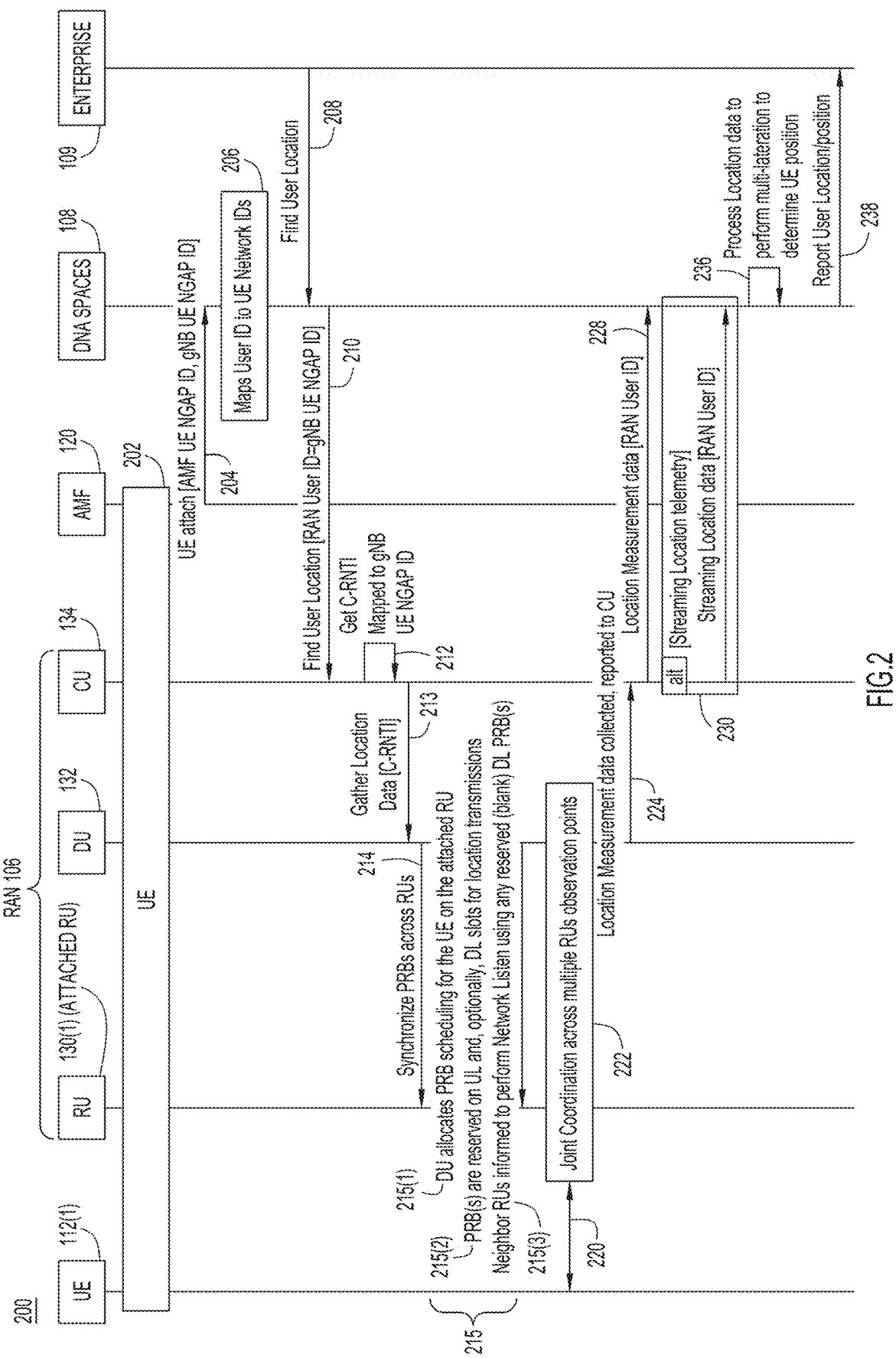
FIG. 2 is a diagram of transactions used for positioning of a UE in the network environment, according to an example embodiment.

With reference to FIG. 2, there is a diagram of example transactions 200 used for positioning of a UE (e.g., UE 112(1)) in network environment 100. The example of FIG. 2 assumes that the UE is in range of each of RUs 130, meaning that PRBs transmitted by the UE may be decoded by the RUs and vice versa. Thus, RUs 130 are viable "observation points" for UE positioning based on the PRBs. In the example of FIG. 2, positioning service 108 includes Cisco DNA spaces, although other positioning services may be used in other examples.

Initially, at 202, the UE performs a UE attach procedure with AMF 120 (and SMF 122) to attach to 5G network 102 through RAN 106. In the example, the UE attaches through RU 130(1) (referred to as the "attached RU"), but not RUs 130(2) and RU 130(3) (referred to as the "neighboring RUs" or the "unattached RUs"). Through the attach procedure, AMF 120 acquires and, at 204, sends to positioning service 108 (i) an AMF UE next generation (NG) application protocol (AP) (NGAP) identifier (ID) ("AMF UE NGAP ID"), and (ii) a gNB UE NGAP ID. The AMF UE NGAP ID and the gNB UE NGAP ID (which serves as a RAN ID for the UE) are UE network IDs used by AMF 122 and RAN 106 of 5G network 102 to identify the UE, respectively.

Upon receiving the network IDs, at 206, positioning service 108 maps or associates the UE network IDs provided by AMF 120 to a user ID for the UE that is configured on the positioning service. That is, positioning service 108 creates a mapping or link between the UE network IDs and the user ID for the UE, and stores the mapping in a database accessible to the positioning service. In an example, the user ID may include one or more of a UE mobile station integrated services digital network (MSISDN) ID, an international mobile equipment identity (IMEI), an international mobile subscriber identity (IMSI), or the like.

At 208, positioning service 108 receives a request for a location of the UE (i.e., a UE location request) from enterprise 109. The UE location request includes the user ID. Upon receiving the UE location request, at 210, positioning service 108 uses the user ID to access the gNB UE NGAP ID (i.e., the RAN ID) based on the mapping created at 206, and forwards the UE location request to CU 134 along with the gNB UE NGAP ID.

Upon receiving the UE location request, at 212, CU 134 obtains a cell-radio network temporary identifier (C-RNTI) associated with the UE, based on the gNB UE NGAP ID, for example. At 213, CU 134 queries/commands DU 132 to acquire/gather location measurements (also referred to as "location data" and "position measurements") for the UE based on the C-RNTI.

Upon receiving the command from CU 134, at 214, DU 132 controls RUs 130 to acquire the location measurements from the RUs. That is, acting as a PRB scheduler for RUs 130, DU 132 synchronizes PRBs for the UE in time/phase and frequency across the RUs, i.e., across the attached RU and the neighboring RUs. RUs 130 will employ the PRBs to derive the location measurements. Therefore, the PRBs are said to be configured for acquiring location measurements.

DU 132 performs scheduling operations 215(1), 215(2), and 215(3) (collectively referred to as scheduling operations 215) to allocate PRB scheduling for the UE across RUs 130 in order to synchronize the PRBs across the RUs. At 215(1), DU 132 allocates PRB scheduling for the UE on the attached RU. At 215(2), DU 132 reserves PRBs on uplink slots (i.e., "uplink PRBs") and, optionally, reserves PRBs on downlink slots (i.e., "downlink PRBs") for location-related transmissions. At 215(3), DU 132 informs the neighboring RUs to perform network listen using any reserved (blank) downlink PRBs. In summary, DU 132 schedules/configures the attached RU to receive uplink PRBs transmitted by the UE during uplink time slots. The DU 132 schedules/configures the neighboring RUs to listen (i.e., perform "network listen") for the uplink PRBs during the uplink time slots (e.g., during blank downlink PRB time slots for the neighboring RUs), and to not transmit during the uplink time slots. The DU 132 also schedules/configures the attached and neighboring RUs to transmit downlink PRBs to the UE during downlink time slots that are time-aligned with each other, or are sequential.

Responsive to/in accordance with the scheduling/configuration imposed by DU 132 across RUs 130, at 220, the RUs exchange the PRBs with the UE. For example, RUs 130 transmit the downlink PRBs to the UE, and receive the uplink PRBs transmitted by the UE. RUs 130 and the UE derive uplink and downlink location measurements for the UE based on the exchanged PRBs. At 222, RUs 130 forward to DU 132 their respective location measurements along with the identifiers of the RUs, e.g., in channel status reports. Also, as described below, location measurements made by the UE are transmitted by the UE to DU 132 through RUs 130.

Upon receiving the location measurements and the identifiers from RUs 130, at 224, DU 132 forwards to CU 134 the location measurements, the identifiers of the RUs, and the coordinates of the RUs. Upon receiving the aforementioned information from DU 132, at 228, CU 134 forwards/sends to positioning service 108 the location measurements (and the related RU information) along with the RAN ID receive by the CU at 210. In addition, at 230, CU 134 may periodically report to positioning service 108 further location measurements in continuous telemetry streams that are triggered by the CU, without dependence on (i.e., without triggers from) core functions 104. Additional location measurements may be trigged at CU 134/DU 132 based on events such as when mobility is detected on the UE or when a handover is triggered. The events may be defined based on certain thresholds using a policy framework.

Upon receiving the location measurements from CU 134, at 236, positioning service 108 determines the location of the UE based on the location measurements. For example, positioning service 108, performs multi-lateration to determine the UE location, and may combine any additional location estimates (e.g., derived from IEEE 802.11/Wi-Fi® and/or Bluetooth/Bluetooth low energy (BLE) positioning algorithms) to converge on a high confidence location for the UE.

At 238, positioning service 108 sends the location of the UE to enterprise 109.

Figure 3:
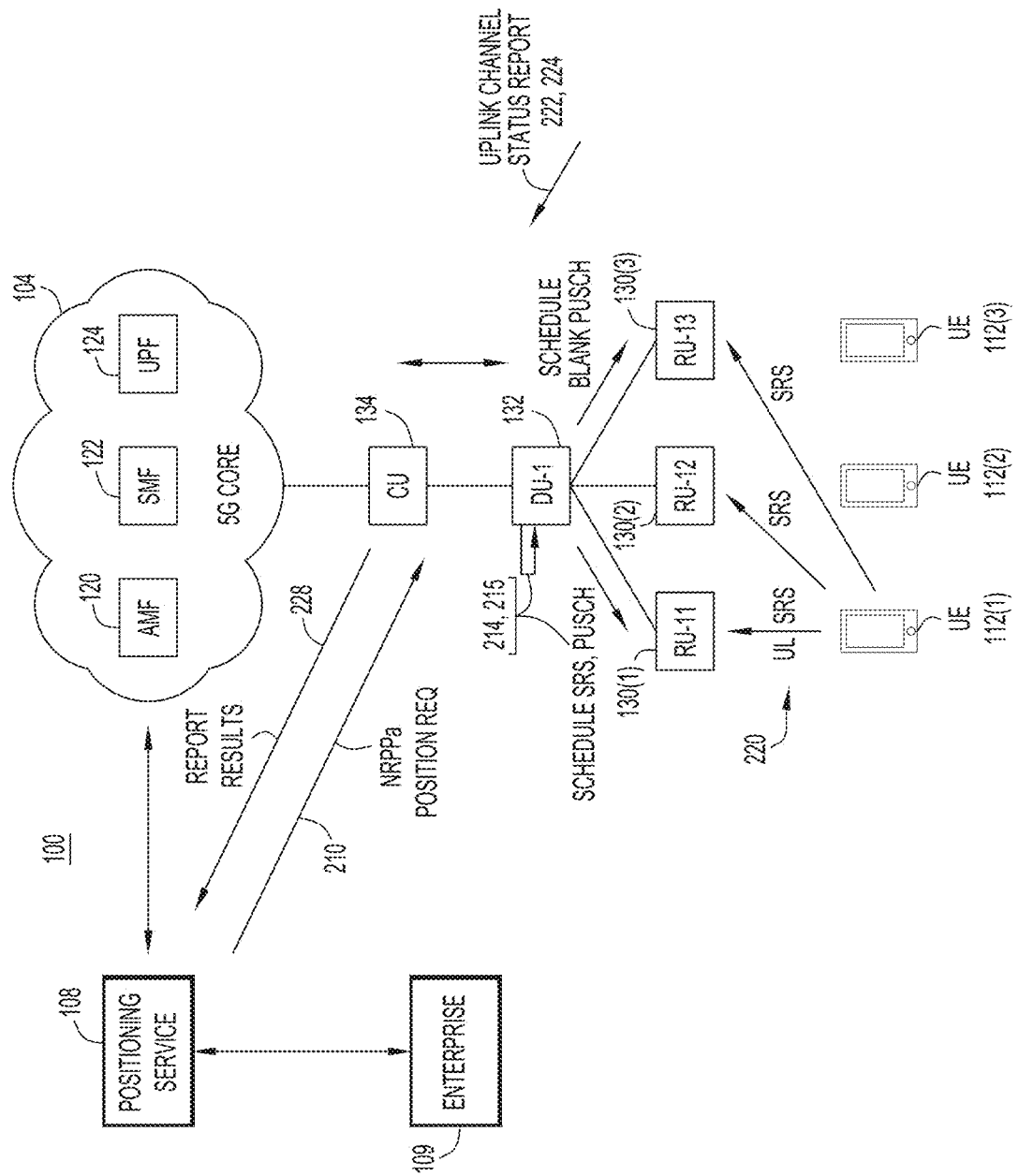
FIG. 3 is an illustration of various signals associated with synchronizing/scheduling uplink physical resource blocks (PRBs) across radio units (RUs) to acquire uplink location measurements for the UE, according to an example embodiment.

With reference to FIG. 3, there is an illustration of various signals associated with synchronizing/scheduling uplink PRBs across RUs 130 to acquire uplink location measurements for the UE, according to an embodiment. The illustration, and description below, primarily expand on synchronizing/scheduling operations 214/215 of FIG. 2.

As described above, upon receiving the UE location request (e.g., in the form an NRPPa position request) from positioning service 108, CU 134 commands DU 132 to acquire location measurements for the UE. Upon receiving the command, DU 132 synchronizes/schedules uplink PRBs for the UE for uplink location measurements as follows.

At 214, DU 132 aligns/synchronizes physical uplink shared channel (PUSCH) (i.e., "data channel") and physical uplink control channel (PUCCH) (i.e., "control channel") time-frequency resources of the DU and all of RUs 130, and identifies time slots and PRBs that can be used in such a way that the UE is scheduled for an uplink exchange with only the attached RU, while the neighboring RUs remain silent during that time slot and PRB position. DU 132 informs the attached RU of the frequency and the demodulation reference signal (DMRS) sequence that will used by the UE to assist the attached RU in decoding the PRB transmitted by the UE. A prerequisite for this is that the time/phase and frequency synchronization of RUs 130 and DU 132 are expected to be under 3GPP defined limits. To achieve such synchronization, either the global navigation satellite system (GNSS) or the precision time protocol (PTP) may be employed by RUs 130 and DU 132.

Based on the data channel and control channel resources determined as described above, at 215, DU 132 schedules the UE to transmit for location measurements on a subset of PRBs (time and frequency resource position). The PRBs scheduled to be transmitted by the UE may include a sounding reference signal (SRS) as well as a regular data burst. At the same time, DU 132 configures the neighboring RUs for decoding the same PRB positions allocated to the attached RU. DU 132 does not schedule any other UE on the neighboring RUs for the PRB resources. DU 132 informs each neighboring RU of the frequency and the DMRS sequence that will used by the UE to assist in decoding the SRS/data burst transmitted by the UE.

At 220, the UE transmits the PRBs (e.g., the SRS) according to the arranged schedule (i.e., the allocated time and frequency). Upon receiving and decoding the PRBs transmitted by the UE, RUs 130 derive respective location measurements or estimates based on the PRBs. For example, each RU may derive the following location measurements or estimates: an uplink relative time of arrival (RTOA); an uplink angle of arrival (AoA); and an uplink reference signal receive power (RSRP)/received signal strength indicator (RSSI).

At 222, RUs 130 provide their location measurements in an uplink channel status report to DU 132, which post-process the location measurements, normalizes the uplink RSRP/RSSI measurements based on a number of antenna elements of the RUs, and then forwards results of the processing to CU 134. At 224, CU 134 forwards the results as processed location measurements to positioning service 108.

Figure 4:
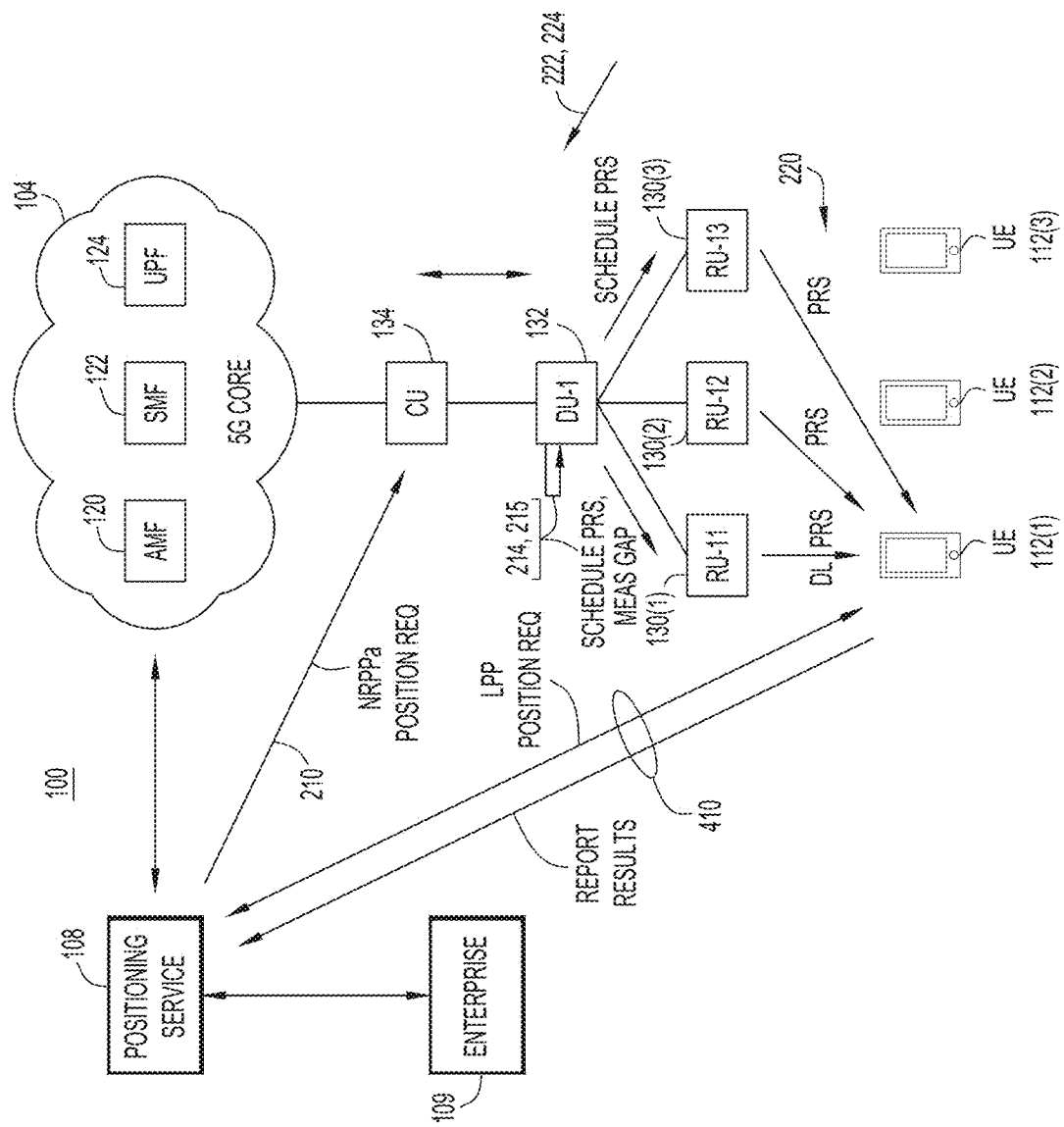
FIG. 4 is an illustration of various signals associated with scheduling/synchronizing downlink PRBs across RUs to acquire downlink location measurements for the UE, according to an example embodiment.

With reference to FIG. 4, there is an illustration of various signals associated with scheduling/synchronizing downlink PRBs across RUs 130 to acquire downlink location measurements for the UE, according to an embodiment. The illustration, and description below, primarily expand on synchronizing/scheduling operations 214/215 of FIG. 2.

Upon receiving from CU 134 the command to acquire location measurements for the UE, DU 132 synchronizes/schedules PRBs for the UE for downlink location measurements as follows. At 214, DU 132 synchronizes the physical data channel and control channel downlink resources across the DU and all RUs 130, and determines slot timing (i.e., time slots) for individual RUs to transmit UE specific positioning reference signals (PRSs). The PRS is a reference signal that supports downlink-based positioning methods. A prerequisite for this is that the time/phase and frequency synchronization of RUs 130 and DU 132 are expected to be under 3GPP defined limits, as described above.

At 215, DU 132 schedules UE a specific PRS on each of RUs 130 per the timing established by the synchronizing. DU 132 also configures the UE accordingly to derive/estimate various downlink location measurements based on individual RU transmission of the PRS by each of RUs 130. The downlink location measurements include downlink reference signal time difference (RSTD), downlink receive (RX)-transmit (TX) (RX-TX) time difference, downlink reference signal receive power (RSRP), and downlink angle of departure (AoD). This is achieved by configuring measurement gaps or using connected mode discontinuous reception (C-DRX).

At 220, RUs 130 transmit their respective PRSs, the UE receives and decodes the PRSs, and derives the downlink location measurements based on the PRSs. The UE sends the downlink location measurements to positioning service 108 over a logical link/connection 410 established with the positioning service (which carries an initial position request from the positioning service to the UE, as well as the location measurements from the UE to the positioning service), although the physical path traversed by the downlink location measurements is through RAN 106, i.e., the same path as for the uplink location measurements.

Figure 5:
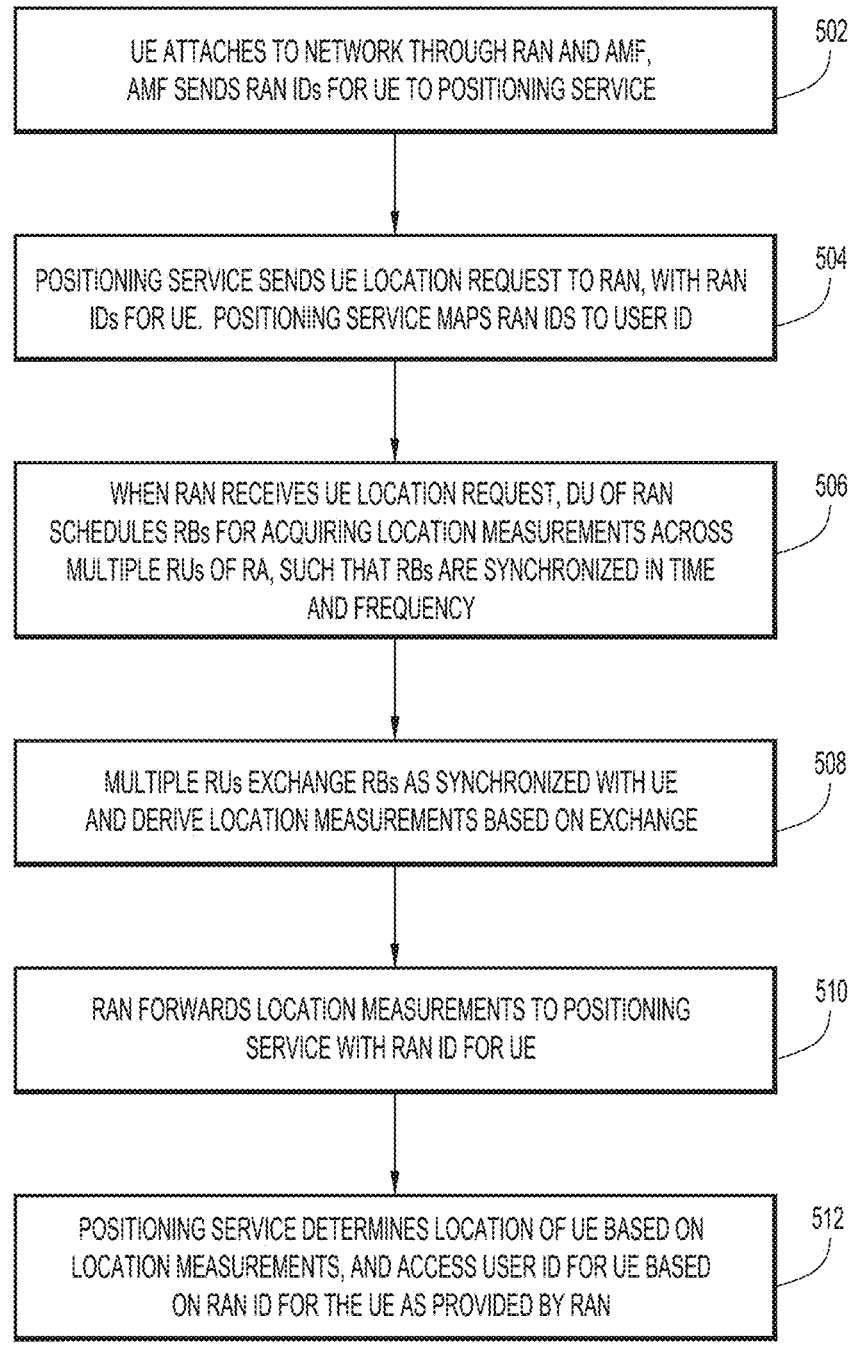
FIG. 5 is a flowchart of operations for UE positioning performed in the network environment, according to an example embodiment.

With reference to FIG. 5, there is a flowchart of example operations 500 for UE positioning of a UE performed in a network, such as a 5G network environment (e.g., 102). The network includes a RAN (e.g., 106) configured to communicate with the UE, an AMF (e.g., 120), and a positioning service (e.g., 108). The RAN may be a disaggregated RAN including multiple RUs (e.g., 130) that are in range of the UE, a DU (e.g., 132) to control the multiple RUs, and a CU (e.g., 134) to control the DU and communicate with the positioning service. Operations 500 are performed without accessing (i.e., by bypassing) an LMF of the network. Operations 500 include operations described above.

At 502, the UE performs an attach procedure with the AMF (through the RAN) to attach to the network. The UE is attached to the network through an attached RU (i.e., the RU that serves the UE) of the multiple RUs and is not attached to neighboring RUs of the multiple RUs. The AMF forwards RAN IDs for the UE to the positioning service, and the positioning service maps the RAN IDs to a user ID configured on or provided to the positioning service.

At 504, the positioning service sends a request for a location of the UE to the RAN. The location request includes at least one of the RAN IDs.

Upon receiving the UE location request, at 506, the RAN (e.g., the DU) schedules resource blocks, configured for acquiring location measurements, across the multiple RUs of the RAN, such that the resource blocks are synchronized in time and frequency across the multiple RUs.

At 508, the multiple RUs, exchange, with the UE, the resource blocks as synchronized, and acquire/derive the location measurements from the multiple RUs based on the exchanging.

At 510, the RUs (and the UE) provide their location measurements to the DU. The DU forwards the location measurements to the positioning service through the CU, which provides to the positioning service the at least one RAN ID for the UE. The location measurements enable the positioning service to determine the location of the UE.

At 512, the positioning service determines the location of the UE using the forwarded location measurements, and finds the user ID based on the mapping between the RAN ID and the UE.

In summary, advantages of the embodiments presented herein include:
a. Leveraging a common DU scheduler for allocating PRBs across multiple RUs to perform faster positioning measurements using a positioning service (e.g., Cisco DNA spaces) and to correlate 5G core and RAN network identifiers tor UE positioning, thus making the positioning solution enterprise friendly.
b. Using the positioning service to combine multiple wireless location services to further refine the position estimate of the user device.
c. Offering network applications and on-demand location service instead of the irregular or inflexible location queries normally conducted by the 5G core LMF.

The embodiments offer a novel on-demand positioning technique leveraging the unique open (O)-RAN (O-RAN)-based split architecture and readily available local/cloud wireless location servers. The technique bypasses the 3GPP core network LMF (along with its considerable overhead and invocation limitations) and, instead, uses an enterprise cloud-based location services platform (e.g., Cisco DNA Spaces) to perform UE location synergistically with other available RF links such as Wi-Fi, BLE, etc. The user may also deploy an enterprise-scaled 5G core without the need for a complex 3GPP LMF add-on. In some network deployments, standard 3GPP packet core elements, such as the AMF and the LMF, are managed by service providers, and the 3GPP packet core is provided as a service to an Enterprise customer. In this arrangement, it is difficult to integrate enterprise managed location services applications with a service provider managed LMF, unless the location services engine bypasses the 3GPP packet core. The embodiments presented herein provide a solution that bypasses the 3GPP packet core.

Figure 6:
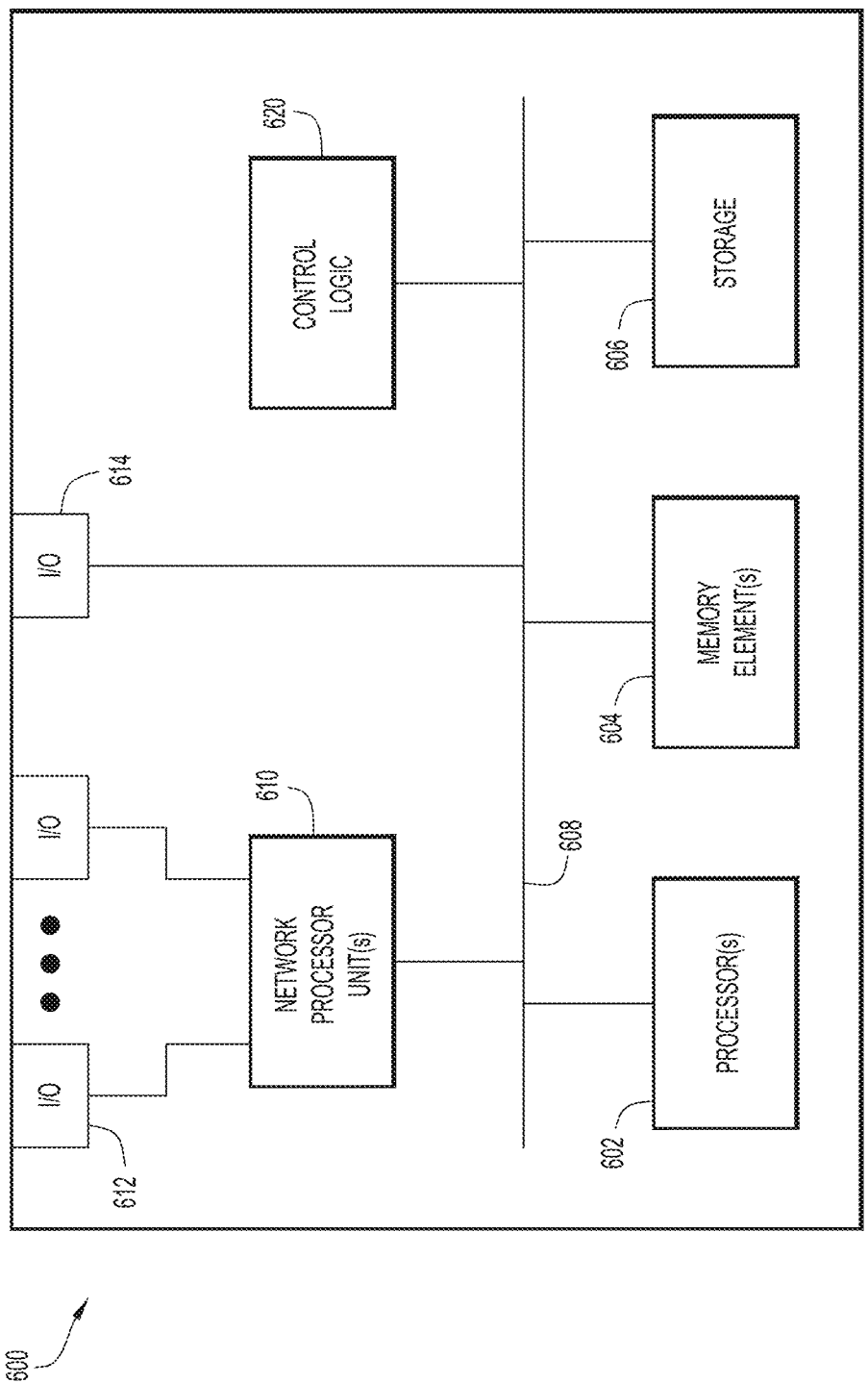
FIG. 6 is a hardware block diagram of a device that may perform functions associated with operations discussed herein, according to an example embodiment.

Referring to FIG. 6, FIG. 6 illustrates a hardware block diagram of a computing device 600 that may perform functions associated with operations discussed herein in connection with the techniques depicted in FIGS. 1-5 In various embodiments, a computing device or apparatus, such as computing device 600 or any combination of computing devices 600, may be configured as any entity/entities as discussed for the techniques depicted in connection with FIGS. 1-5 in order to perform operations of the various techniques discussed herein. For example, computing device 600 or portions thereof may represent AMF 120, SMF 122, UPF 124, positioning service 108, enterprise 109, each of UEs 112, and RAN 106, including CU 134, DU 132, and each of RUs 130.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa) or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic, or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity, and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source, and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IPv4 and/or IPv6 addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, in some aspects, the techniques described herein relate to a method including: at a radio access network configured to communicate with a user equipment (UE) wirelessly, an access and mobility management function (AMF), and a positioning service, and through which the UE attached to a network using an attach procedure with the AMF: upon receiving a request for a location of the UE from the positioning service, scheduling of resource blocks, configured for acquiring location measurements, across multiple radio units of the radio access network that are in range of the UE, such that the resource blocks are synchronized in time and frequency across the multiple radio units; by the multiple radio units, exchanging, with the UE, the resource blocks as synchronized, and acquiring the location measurements from the multiple radio units based on exchanging; and forwarding the location measurements to the positioning service to enable the positioning service to determine the location of the UE based on the location measurements.

In some aspects, the techniques described herein relate to a method, wherein: the radio access network is a disaggregated radio access network that includes the multiple radio units, a distributed unit (DU) to control the multiple radio units, and a centralized unit (CU) through which the DU communicates with the access and mobility management function; and receiving, scheduling, and forwarding are performed by the DU.

In some aspects, the techniques described herein relate to a method, wherein: the UE is attached to the network through an attached radio unit of the multiple radio units and is not attached to neighboring radio units of the multiple radio units; scheduling includes scheduling (i) the attached radio unit to receive an uplink resource block transmitted by the UE in an uplink direction during a time slot, and (ii) the neighboring radio units to listen for the uplink resource block during the time slot, and to not transmit during the time slot; and exchanging includes receiving the uplink resource block at the multiple radio units.

In some aspects, the techniques described herein relate to a method, wherein: receiving the uplink resource block includes receiving a sounding reference signal transmitted by the UE at the multiple radio units; and acquiring the location measurements includes acquiring one or more of an uplink relative time of arrival (RTOA), an uplink angle of arrival (AoA), and an uplink reference signal receive power (RSRP) at each of the multiple radio units based on receiving the sounding reference signal at the multiple radio units.

In some aspects, the techniques described herein relate to a method, wherein: scheduling includes scheduling the multiple radio units to transmit downlink resource blocks to the UE in a downlink direction during time slots that are aligned with each other or sequential; and exchanging includes transmitting the downlink resource blocks from the multiple radio units.

In some aspects, the techniques described herein relate to a method, wherein: transmitting the downlink resource blocks includes transmitting position reference signals from the multiple radio units to the UE; and acquiring the location measurements includes acquiring, from the UE, one or more of a downlink reference signal time difference (RSTD) as measured at the UE, a downlink receive (RX)-transmit (TX) (RX-TX) time difference as measured at the UE, and a downlink reference signal receive power (RSRP) as measured as the UE that are based on transmitting the position reference signals from the multiple radio units to the UE.

In some aspects, the techniques described herein relate to a method, further including: at the positioning service, determining the location of the UE based on the location measurements for the UE acquired by the multiple radio units.

In some aspects, the techniques described herein relate to a method, further including, at the positioning service: mapping a user identifier for the UE that is configured on the positioning service to a radio access network identifier for the UE provided by the access and mobility management function; and upon receiving, from the radio access network, the location measurements as acquired by the multiple radio units and which are identified by the radio access network identifier, associating the location measurements to the user identifier based on mapping.

In some aspects, the techniques described herein relate to a method, wherein the network includes a 5G network.

In some aspects, the techniques described herein relate to a method, further including: performing scheduling, exchanging, and forwarding without interacting with a location management function in the network.

In some aspects, the techniques described herein relate to an apparatus including: a radio access network configured to communicate with a user equipment (UE) wirelessly, an access and mobility management function (AMF), and a positioning service, and through which the UE attached to a network using an attach procedure with the AMF, wherein the radio access network is configured to perform: upon receiving a request for a location of the UE from the positioning service, scheduling of resource blocks, configured for acquiring location measurements, across multiple radio units of the radio access network that are in range of the UE, such that the resource blocks are synchronized in time and frequency across the multiple radio units; using the multiple radio units, exchanging, with the UE, the resource blocks as synchronized, and acquiring the location measurements from the multiple radio units based on exchanging;

and forwarding the location measurements to the positioning service to enable the positioning service to determine the location of the UE based on the location measurements.

In some aspects, the techniques described herein relate to an apparatus, wherein: the radio access network is a disaggregated radio access network that includes the multiple radio units, a distributed unit (DU) to control the multiple radio units, and a centralized unit (CU) through which the DU communicates with the AMF; and the DU is configured to perform receiving, scheduling, and forwarding.

In some aspects, the techniques described herein relate to an apparatus, wherein: the UE is attached to the network through an attached radio unit of the multiple radio units and is not attached to neighboring radio units of the multiple radio units; the radio access network is configured to perform scheduling by scheduling (i) the attached radio unit to receive an uplink resource block transmitted by the UE in an uplink direction during a time slot, and (ii) the neighboring radio units to listen for the uplink resource block during the time slot, and to not transmit during the time slot; and the multiple radio units are configured to perform exchanging by receiving the uplink resource block.

In some aspects, the techniques described herein relate to an apparatus, wherein the multiple radio units are further configured to perform: receiving the uplink resource block by receiving a sounding reference signal transmitted by the UE; and acquiring the location measurements by acquiring one or more of an uplink relative time of arrival (RTOA), an uplink angle of arrival (AoA), and an uplink reference signal receive power (RSRP) based on receiving the sounding reference signal.

In some aspects, the techniques described herein relate to an apparatus, wherein: the radio access network in configured to perform scheduling by scheduling the multiple radio units to transmit downlink resource blocks to the UE in a downlink direction during time slots that are aligned with each other or sequential; and the multiple radio units are configured to perform exchanging by transmitting the downlink resource blocks from the multiple radio units.

In some aspects, the techniques described herein relate to an apparatus, wherein the multiple radio units are further configured to perform: transmitting the downlink resource blocks by transmitting position reference signals from the multiple radio units to the UE; and acquiring the location measurements by acquiring, from the UE, one or more of a downlink reference signal time difference (RSTD) as measured at the UE, a downlink receive (RX)-transmit (TX) (RX-TX) time difference as measured at the UE, and a downlink reference signal receive power (RSRP) as measured as the UE that are based on transmitting the position reference signals from the multiple radio units to the UE.

In some aspects, the techniques described herein relate to an apparatus, wherein the network includes a 5G network.

In some aspects, the techniques described herein relate to non-transitory computer readable media encoded with instructions that, when executed by one or more processors of a radio access network configured to communicate with a user equipment (UE) wirelessly, an access and mobility management function (AMF), and a positioning service, and through which the UE attached to a network using an attach procedure with the AMF, cause the one or more processors to perform: upon receiving a request for a location of the UE from the positioning service, scheduling of resource blocks, configured for acquiring location measurements, across multiple radio units of the radio access network that are in range of the UE, such that the resource blocks are synchronized in time and frequency across the multiple radio units; by the multiple radio units, exchanging, with the UE, the resource blocks as synchronized, and acquiring the location measurements from the multiple radio units based on exchanging; and forwarding the location measurements to the positioning service to enable the positioning service to determine the location of the UE based on the location measurements.

In some aspects, the techniques described herein relate to a non-transitory computer readable media, wherein: the radio access network is a disaggregated radio access network that includes the multiple radio units, a distributed unit (DU) to control the multiple radio units, and a centralized unit (CU) through which the DU communicates with the AMF.

In some aspects, the techniques described herein relate to a non-transitory computer readable media, wherein: the UE is attached to the network through an attached radio unit of the multiple radio units and is not attached to neighboring radio units of the multiple radio units; the instructions to cause the one or more processors to perform scheduling include instructions to cause the one or more processors to perform scheduling (i) the attached radio unit to receive an uplink resource block transmitted by the UE in an uplink direction during a time slot, and (ii) the neighboring radio units to listen for the uplink resource block during the time slot, and to not transmit during the time slot; and the instructions to cause the one or more processors to perform exchanging include instructions to cause the one or more processors to perform receiving the uplink resource block at the multiple radio units.

In some aspects, the techniques described herein relate to a system including: a positioning service hosted on a computer; and a radio access network configured to communicate with a user equipment (UE) wirelessly, an access and mobility management function (AMF), and the positioning service, and through which the UE attached to a network using an attach procedure with the AMF, wherein the radio access network is configured to perform: upon receiving a request for a location of the UE from the positioning service, scheduling of resource blocks, configured for acquiring location measurements, across multiple radio units of the radio access network that are in range of the UE, such that the resource blocks are synchronized in time and frequency across the multiple radio units; using the multiple radio units, exchanging, with the UE, the resource blocks as synchronized, and acquiring the location measurements from the multiple radio units based on exchanging; and forwarding the location measurements to the positioning service, wherein the positioning service is configured to perform determining the location of the UE based on the location measurements.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a radio access network including multiple radio units and configured to communicate with a user equipment (UE) wirelessly, an access and mobility management function (AMF), and a positioning service, wherein the UE is attached to a network through an attached radio unit, but not through neighboring radio units, of the multiple radio units:

upon receiving a request for a location of the UE from the positioning service, scheduling resource blocks across the multiple radio units for acquiring location measurements, such that the resource blocks are synchronized in time and frequency, the attached radio unit is to receive an uplink resource block transmitted by the UE during a time slot, and the neighboring radio units are to listen for the uplink resource block, and not transmit;

by the multiple radio units, receiving the uplink resource block from the UE, and acquiring the location measurements from the multiple radio units based on receiving the uplink resource block; and forwarding the location measurements to the positioning service to enable the positioning service to determine the location of the UE based on the location measurements.

2. The method of claim 1, wherein:
the radio access network is a disaggregated radio access network that includes the multiple radio units, a distributed unit (DU) to control the multiple radio units, and a centralized unit (CU) through which the DU communicates with the access and mobility management function; and
receiving the request, scheduling, and forwarding are performed by the DU.

3. The method of claim 1, wherein:
the request includes a user identifier for the UE.

4. The method of claim 1, wherein:
receiving the uplink resource block includes receiving a sounding reference signal transmitted by the UE at the multiple radio units; and
acquiring the location measurements includes acquiring one or more of an uplink relative time of arrival (RTOA), an uplink angle of arrival (AoA), and an uplink reference signal receive power (RSRP) at each of the multiple radio units based on receiving the sounding reference signal at the multiple radio units.

5. The method of claim 1, wherein:
scheduling includes scheduling the multiple radio units to transmit downlink resource blocks to the UE in a downlink direction during time slots that are aligned with each other or sequential; and
the method further includes transmitting the downlink resource blocks from the multiple radio units.

6. The method of claim 5, wherein:
transmitting the downlink resource blocks includes transmitting position reference signals from the multiple radio units to the UE; and
acquiring the location measurements includes acquiring, from the UE, one or more of a downlink reference signal time difference (RSTD) as measured at the UE, a downlink receive (RX)-transmit (TX) (RX-TX) time difference as measured at the UE, and a downlink reference signal receive power (RSRP) as measured as the UE that are based on transmitting the position reference signals from the multiple radio units to the UE.

7. The method of claim 1, further comprising:
at the positioning service, determining the location of the UE based on the location measurements for the UE acquired by the multiple radio units.

8. The method of claim 1, further comprising, at the positioning service:
mapping a user identifier for the UE that is configured on the positioning service to a radio access network identifier for the UE provided by the access and mobility management function; and upon receiving, from the radio access network, the location measurements as acquired by the multiple radio units and which are identified by the radio access network identifier, associating the location measurements to the user identifier based on mapping.

9. The method of claim 1, wherein the network includes a 5G network.

10. The method of claim 1, further comprising:
performing scheduling, receiving the uplink resource block, and forwarding without interacting with a location management function in the network.

11. An apparatus comprising:
a radio access network including multiple radio units and configured to communicate with a user equipment (UE) wirelessly, an access and mobility management function (AMF), and a positioning service, wherein the UE is attached to a network through an attached radio unit, but not through neighboring radio units, of the multiple radio units, wherein the radio access network is configured to perform:
upon receiving a request for a location of the UE from the positioning service, scheduling resource blocks across the multiple radio units for acquiring location measurements, such that the resource blocks are synchronized in time and frequency, the attached radio unit is to receive an uplink resource block transmitted by the UE during a time slot, and the neighboring radio units are to listen for the uplink resource block, and not transmit;
using the multiple radio units, receiving the uplink resource block from the UE, and acquiring the location measurements from the multiple radio units based on receiving the uplink resource block; and
forwarding the location measurements to the positioning service to enable the positioning service to determine the location of the UE based on the location measurements.

12. The apparatus of claim 11, wherein:
the radio access network is a disaggregated radio access network that includes the multiple radio units, a distributed unit (DU) to control the multiple radio units, and a centralized unit (CU) through which the DU communicates with the AMF; and
the DU is configured to perform receiving the request, scheduling, and forwarding.

13. The apparatus of claim 11, wherein:
the request includes a user identifier for the UE.

14. The apparatus of claim 11, wherein the multiple radio units are further configured to perform:
receiving the uplink resource block by receiving a sounding reference signal transmitted by the UE; and
acquiring the location measurements by acquiring one or more of an uplink relative time of arrival (RTOA), an uplink angle of arrival (AoA), and an uplink reference signal receive power (RSRP) based on receiving the sounding reference signal.

15. The apparatus of claim 11, wherein:
the radio access network is configured to perform scheduling by scheduling the multiple radio units to transmit downlink resource blocks to the UE in a downlink direction during time slots that are aligned with each other or sequential; and
the multiple radio units are further configured to perform transmitting the downlink resource blocks from the multiple radio units.

16. The apparatus of claim 15, wherein the multiple radio units are further configured to perform:

transmitting the downlink resource blocks by transmitting position reference signals from the multiple radio units to the UE; and acquiring the location measurements by acquiring, from the UE, one or more of a downlink reference signal time difference (RSTD) as measured at the UE, a downlink receive (RX)-transmit (TX) (RX-TX) time difference as measured at the UE, and a downlink reference signal receive power (RSRP) as measured as the UE that are based on transmitting the position reference signals from the multiple radio units to the UE.

17. The apparatus of claim 11, wherein the network includes a 5G network.

18. Non-transitory computer readable media encoded with instructions that, when executed by one or more processors of a radio access network including multiple radio units and configured to communicate with a user equipment (UE) wirelessly, an access and mobility management function (AMF), and a positioning service, wherein the UE is attached to a network through an attached radio unit, but not through neighboring radio units, of the multiple radio units, cause the one or more processors to perform:

upon receiving a request for a location of the UE from the positioning service, scheduling of resource blocks across the multiple radio units for acquiring location measurements, such that the resource blocks are synchronized in time and frequency, the attached radio unit is to receive an uplink resource block transmitted by the UE during a time slot, and the neighboring radio units are to listen for the uplink resource block, and not transmit;

by the multiple radio units, receiving the uplink resource block from the UE, and acquiring the location measurements from the multiple radio units based on receiving the uplink resource block; and forwarding the location measurements to the positioning service to enable the positioning service to determine the location of the UE based on the location measurements.

19. The non-transitory computer readable media of claim 18, wherein:

the radio access network is a disaggregated radio access network that includes the multiple radio units, a distributed unit (DU) to control the multiple radio units, and a centralized unit (CU) through which the DU communicates with the AMF.

20. The non-transitory computer readable media of claim 18, wherein:

the request includes a user identifier for the UE.

* * * * *